US010616565B2

United States Patent
Cheung

(10) Patent No.: US 10,616,565 B2
(45) Date of Patent: Apr. 7, 2020

(54) SYSTEM AND METHOD FOR FOVEATED SIMULATION

(71) Applicant: THE BOEING COMPANY, Chicago, IL (US)

(72) Inventor: William Wai Ho Cheung, Wilston (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/107,946

(22) Filed: Aug. 21, 2018

(65) Prior Publication Data

US 2020/0068190 A1    Feb. 27, 2020

(51) Int. Cl.
| | |
|---|---|
| *H04N 13/332* | (2018.01) |
| *H04N 13/383* | (2018.01) |
| *H04N 13/117* | (2018.01) |
| *G06F 3/02* | (2006.01) |
| *G06F 9/54* | (2006.01) |
| *G06F 9/52* | (2006.01) |

(Continued)

(52) U.S. Cl.
CPC ......... *H04N 13/332* (2018.05); *G06F 3/0227* (2013.01); *G06F 9/526* (2013.01); *G06F 9/54* (2013.01); *G06T 19/006* (2013.01); *H04N 13/117* (2018.05); *H04N 13/122* (2018.05); *H04N 13/383* (2018.05)

(58) Field of Classification Search
CPC .. H04N 13/332; H04N 13/383; H04N 13/117; H04N 13/122; G06F 3/0227; G06F 9/526; G06F 9/54; G06T 19/006
USPC ......................................................... 348/53
See application file for complete search history.

(56) References Cited

U.S. PATENT DOCUMENTS

| | | | | |
|---|---|---|---|---|
| 5,400,177 A | * | 3/1995 | Petitto .................... | G02B 5/045 359/451 |
| 2003/0117397 A1 | * | 6/2003 | Hubrecht ............... | G06T 17/00 345/420 |

(Continued)

FOREIGN PATENT DOCUMENTS

EP        3346371 A1     7/2018

OTHER PUBLICATIONS

Extended European Search Report for Application No. 19182294.9 dated Dec. 5, 2019, 9 pgs.

*Primary Examiner* — Brian T Pendleton
*Assistant Examiner* — Alan H Luong
(74) *Attorney, Agent, or Firm* — Moore IP Law

(57) ABSTRACT

A system includes a head mounted display (HMD), a processor, and a memory. The HMD is configured to generate sensor data indicative of a gaze vector of a user and a position of the user. The processor is configured to communicate with the HMD. The memory is coupled to the processor and stores instructions that, when executed by the processor, cause the processor to obtain data indicating the gaze vector of the user and the position of the user. The instructions also cause the processor to determine a component vector for a virtual component of a virtual reality simulator based on the position of the user and a position of the virtual component. The instructions further cause the processor to calculate an alignment value based on the gaze vector and the component vector, and adjust a simulation setting of the virtual component based on the alignment value.

20 Claims, 9 Drawing Sheets

(51) Int. Cl.
*G06T 19/00* (2011.01)
*H04N 13/122* (2018.01)

(56) References Cited

U.S. PATENT DOCUMENTS

| | | | |
|---|---|---|---|
| 2012/0011499 A1* | 1/2012 | Conover | G06F 9/45537 |
| | | | 718/1 |
| 2016/0229521 A1* | 8/2016 | De Miranda Car | B64C 27/56 |
| 2017/0169602 A1* | 6/2017 | Blackmon | G06F 3/013 |
| 2017/0206707 A1* | 7/2017 | Guay | G06F 16/2246 |
| 2017/0287112 A1 | 10/2017 | Stafford et al. | |
| 2018/0007258 A1* | 1/2018 | Seko | H04N 5/23203 |
| 2018/0224935 A1 | 8/2018 | Thunström | |
| 2018/0357810 A1* | 12/2018 | Young | G06T 15/005 |

\* cited by examiner

US 10,616,565 B2

SYSTEM AND METHOD FOR FOVEATED SIMULATION

FIELD OF THE DISCLOSURE

The present disclosure is generally related to foveated simulation for virtual reality applications and augmented reality applications.

BACKGROUND

Foveated rendering is a technique for varying detail of an image based on a fixation point, such as where a user is looking. Foveated rendering can be used by computers to reduce an overall amount detail contained in a displayed image and to concentrate higher detail levels near a center of a user's field of vision. However, even with foveated rendering, current technology cannot run complex virtual reality applications or augmented reality applications at high fidelity.

SUMMARY

In a particular implementation, a system includes a head mounted display (HMD), a processor, and a memory. The HMD is configured to generate sensor data indicative of a gaze vector of a user and a position of the user. The processor is configured to communicate with the HMD. The memory is coupled to the processor and stores instructions that, when executed by the processor, cause the processor to obtain data indicating the gaze vector of the user and the position of the user. The instructions also cause the processor to determine a component vector for a virtual component of a virtual reality simulator based on the position of the user and a position of the virtual component. The instructions further cause the processor to calculate an alignment value based on the gaze vector and the component vector, and adjust a simulation setting of the virtual component based on the alignment value.

In another particular implementation, a device includes a processor and a memory. The memory is coupled to the processor and stores instructions that, when executed by the processor, cause the processor to obtain data indicating a gaze vector of a user and a position of the user. The instructions also cause the processor to determine a component vector for a virtual component of a virtual reality simulator based on the position of the user and a position of the virtual component. The instructions further cause the processor to calculate an alignment value based on the gaze vector and the component vector, and adjust a simulation setting of the virtual component based on the alignment value.

In yet another particular implementation, a computer-readable storage device includes instructions, that when executed, cause a processor to perform operations including obtaining data indicating a gaze vector of a user and a position of the user. The instructions also cause the processor to perform operations including determining a component vector for a virtual component of a virtual reality simulator based on the position of the user and a position of the virtual component. The instructions also cause the processor to perform operations including calculating an alignment value based on the gaze vector and the component vector, and adjusting a simulation setting of the virtual component based on the alignment value.

By using foveated simulation, the system consumes less processing and system resources and provides a similar level of visual quality and simulation fidelity in the area of gaze fixation. The additional resources can be used to increase the visual frame rate, reduce motion sickness, and/or improve visual quality, thereby improving immersion to the user in VR. Foveated simulation enables simulation at a relatively higher visual fidelity as compared to non-foveated simulation with the same computing hardware.

DETAILED DESCRIPTION

The disclosed embodiments provide systems and methods for foveated simulation. Foveated simulation can be used with virtual reality applications and augmented reality applications. Foveated simulation reduces computational resources of virtual components of the virtual reality applications and the augmented reality applications outside of a gaze fixation point of a user. The gaze fixation point of the user may be determined by a gaze tracking system located within a head mounted display.

High fidelity simulation for virtual reality applications and augmented reality applications requires computation load split between simulation and rendering the visual scene (e.g., a virtual environment or an augmented environment). By reducing the computational load outside of the gaze fixation point for both simulation as well as rendering, significant computational performance gains can be attained. The additional computational resources can be used to increase the visual frame rate, reduce motion sickness, and/or improve visual quality, which increases user immersion in the virtual or augmented reality application.

Figure 1:
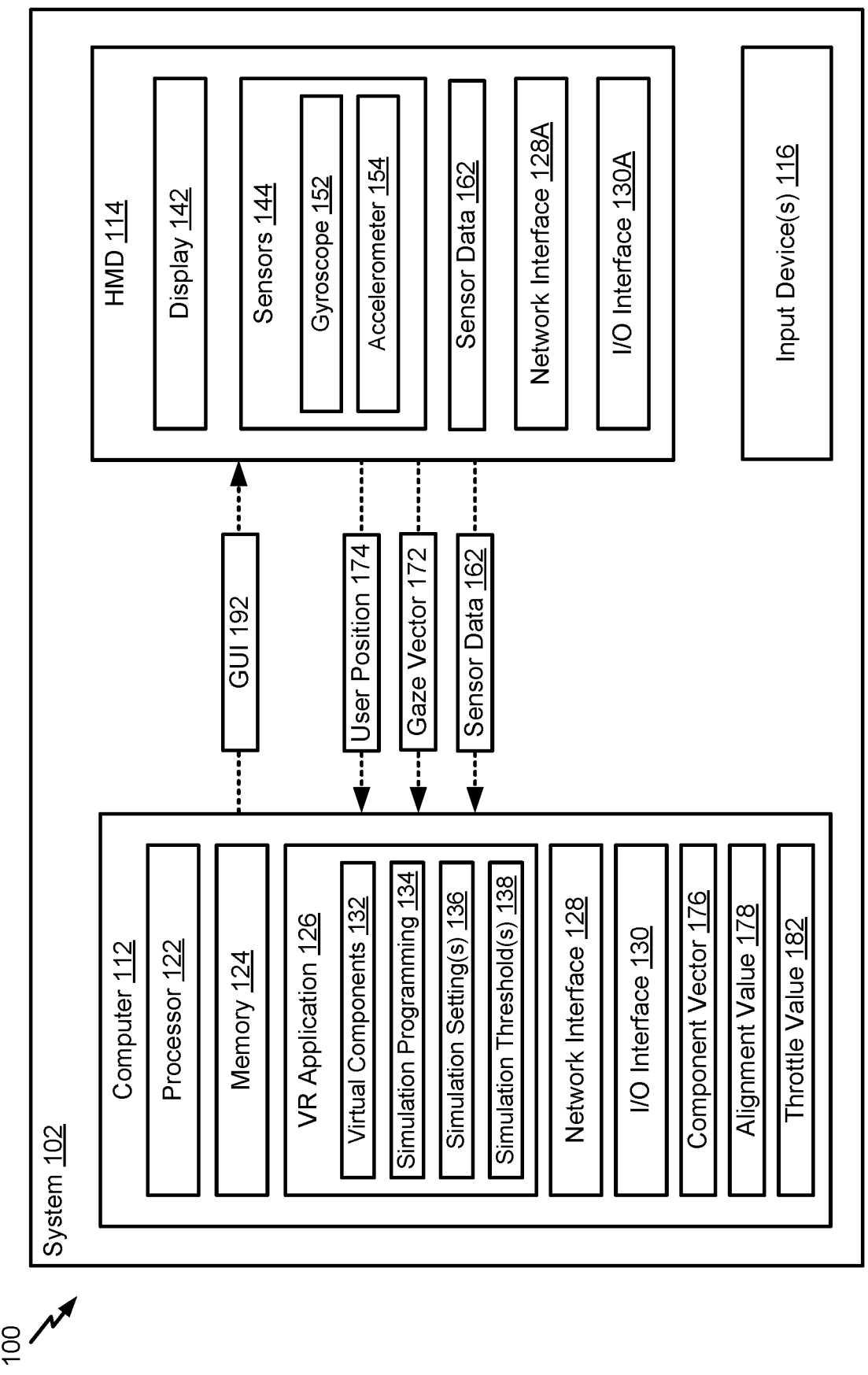
FIG. 1 is a block diagram that illustrates an example a system for foveated simulation.

FIG. 1 illustrates a block diagram 100 of an example of a system 102 for foveated simulation. The system 102 includes a computer 112 and a head mounted display (HMD) 114. The computer 112 includes a processor 122 and a memory 124 coupled to the processor 122. The memory 124 stores instructions that, when executed by the processor 122, cause the processor 122 to perform various operations to enable foveated simulation using a VR application 126. The processor 122 performs foveated simulation based on where a user is looking (as indicated by a gaze vector 172). In some implementations, the processor 122 performs selective foveated simulation based on resources of the processor 122, the computer 112, or both, as further described herein.

The Virtual Reality (VR) application 126 is configured to provide a virtual environment (e.g., a virtual environment 302 of FIGS. 3-7) and simulation of the virtual environment for entertainment, gaming, or training purposes. As illustrated in the example system 102 of FIG. 1, the VR application 126 is a flight simulator application. The VR application 126 includes virtual components 132 that correspond to actual components of an aircraft flight deck, such as avionics and control systems. Each virtual component 132 is a simulated version or an emulated version of actual hardware and/or software components of the aircraft, and is configured to simulate or emulate operation of the actual hardware and/or software components. For example, a virtual component 132 of the VR application 126 can simulate (e.g., approximate) operations or emulate (e.g., replicate) operations performed by a hardware component of an aircraft to provide a realistic virtual environment. As used below, the terms simulate and simulation encapsulate both simulation (i.e., imitation by at least approximation) and emulation (i.e., imitation by replication). To illustrate, emulate refers to replicating internal processes of a system being emulated to produce the same output given a particular input. Simulate refers to generating the same output given the particular input for the system. However in simulation, the internal processes do not have to be replicated (i.e., the internal processes can be replicated or can be altered).

The VR application 126 further includes simulation programming 134, simulation settings 136, and simulation thresholds 138. The processor 122 generates the virtual component 132 (to simulate an actual component) based on the simulation programming 134, simulation settings 136, and simulation thresholds 138, as described further herein. Each virtual component 132 may have associated or corresponding simulation programming 134, simulation settings 136, and simulation thresholds 138. Adjusting one or more of the simulation programming 134, the simulation settings 136, or the simulation thresholds 138 adjusts a fidelity of the simulation of the VR application 126. For example, reducing an accuracy of a particular simulation programming 134, reducing a particular simulation setting 136, and/or reducing a particular simulation threshold 138 reduces a fidelity of the simulation of an actual component by a particular virtual component 132 of the VR application 126. By reducing the fidelity of the simulation of the VR application 126, the VR application 126 consumes less processing resources of the processor 122 (e.g., central processing unit (CPU) resources) and computing resources (e.g., random access memory (RAM), graphics processing unit (GPU) resources, etc.) of the computer 112.

The computer 112 further includes a network interface 128 and an I/O interface 130. The network interface 128 is coupled to the processor 122 and is configured to communicate with one or more network devices, the HMD 114, or a combination thereof. The network interface 128 may include or correspond to a wired interface, a wireless interface, or a combination thereof. The I/O interface 130 is coupled to the processor 122 and is configured to send and receive signals and/or data from other devices, such as the HMD 114 or one or more input devices 116. In some implementations, the I/O interface 130 includes a Universal Serial Bus (USB) 3.0 interface, a DisplayPort interface, a High-Definition Multimedia Interface (HDMI) interface, or a combination thereof.

The HMD 114 includes a display 142, one or more sensors 144, and an I/O interface 130A. In some implementations, the HMD 114 further includes a processor and memory, similar to the processor 122 and the memory 124. In other implementations, the computer 112 is integrated within the HMD 114 and the system 102 does not include a separate computer 112. Additionally, the HMD 114 may include a network interface, such as a network interface 128A, configured to communicate with one or more network devices, the computer 112, or a combination thereof.

The display 142 is configured to display or output video. For example, the display 142 is configured to display a graphical user interface (GUI) 192 generated by the computer 112. The GUI 192 includes or corresponds to scenes or frames depicting the virtual environment of the VR application 126.

The one or more sensors 144 are configured to generate sensor data 162 that is indicative of a gaze vector 172 of a user (e.g., an avatar of the user in the virtual environment) and a position 174 of the user in the virtual environment. The gaze vector 172 corresponds to a viewing direction of the user in the virtual environment. The gaze vector 172 may correspond to a direction of the head (e.g., when determined by a head tracker) or a direction of the eyes (e.g., when determined by an eye tracker). In some implementations, the gaze vector 172 is a unit vector. The one or more sensors 144 include one or more gyroscopes 152, accelerometers 154, eye trackers, infrared sensors/emitters, electro-optical sensors/emitters, inertia sensors, or a combination thereof. The eye tracker includes a camera or another device configured to track the retina of the user, such as the fovea of the retina.

The I/O interface 130A is configured to send and receive signals and/or data from other devices, such as the computer 112 or the one or more input devices 116. For example, the I/O interface 130A sends the sensor data 162 to the computer 112 and/or sends the gaze vector 172 and the position 174, i.e., data indicating the gaze vector 172 and the position 174, to the computer 112. In implementations in which the I/O interface 130A of the HMD 114 sends the data indicating the gaze vector 172 and the position 174 to the computer 112, the HMD 114 includes a processor, similar to processor 122, and the processor of the HMD 114 processes the sensor data 162 to generate the data indicating the gaze vector 172 and the position 174. Alternatively, the network interface 128A is configured to send the sensor data 162 to the computer 112 and/or sends the gaze vector 172 and the position 174, i.e., data indicating the gaze vector 172 and the position 174, to the computer 112.

The one or more input devices 116 are configured to generate signals and/or data based on user inputs and to output the signals and/or the data to the computer 112, the HMD 114, or both. In some implementations, the one or more input devices 116 include or correspond to a keyboard and a mouse. In other implementations, the one or more input devices 116 include or correspond to a controller, such as gamepad or joystick. As an illustrative, non-limiting example, when the VR application 126 is a flight simulator application, the one or more input devices 116 include or correspond to one or more instrument control panels of an aircraft, an inceptor of the aircraft, a control yoke, one or more rudder pedals, a collective, a cyclic, or a combination thereof. The one or more input devices 116 may be coupled to the computer 112, the HMD 114, or both, via a wired interface or a wireless interface.

Although a VR application 126 is described in FIG. 1, in other implementations the system 102 includes an Augmented Reality (AR) application. For example, the system 102 (e.g., the HMD 114 thereof) may be portable and may operate inside of an actual flight deck of an aircraft overlaying virtual objects on the physical environment to generate an augmented environment. As another example, the system 102 can be operated in a replica flight deck of the aircraft and virtual objects can be overlaid on the replica flight deck.

In some implementations, the processor 122 employs selective foveated simulation based on resources of the processor 122 and/or resources of the computer 112. For example, the resources may be in terms of used resources or available resources. To illustrate, the processor 122 determines whether the available resources of the processor 122 are greater than a selective foveation threshold. Responsive to determining that the available resources of the processor 122 are greater than the selective foveation threshold, the processor 122 adjusts the simulation setting 136 of the virtual component 132 to a base value (e.g., a default value representing 100 percent or high fidelity simulation). Responsive to determining that the available resources of the processor 122 are less than or equal to than the selective foveation threshold, the processor 122 performs foveated simulation, such as performs one or more operations described with reference to FIG. 2.

Additionally or alternatively, the processor 122 employs selective foveated simulation based on a user input. For example, a user of the computer 112 can set a foveated simulation setting of the VR application 126 to turn on or turn off foveated simulation.

In some implementations, the system 102 of FIG. 1 can perform foveated rendering to further reduce processing resources and system resources, and to enable high fidelity simulation of complex VR applications 126. Operation of the system 102 of FIG. 1 is described with respect to FIG. 2.

Figure 2:
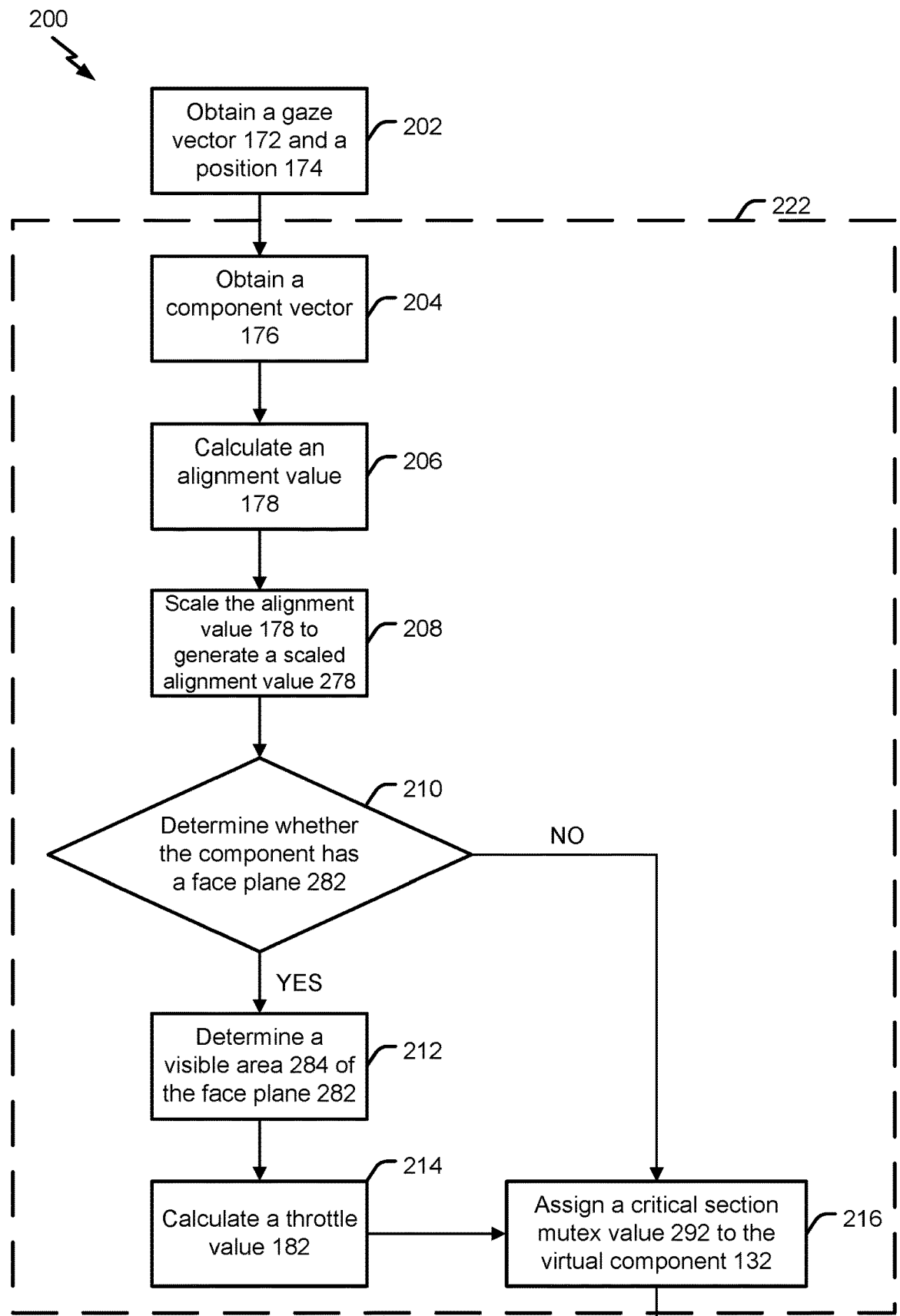
FIG. 2 is a flow chart of an example of a method of foveated simulation performed by the system of FIG. 1.

FIG. 2 is a flow chart 200 of an example of foveated simulation performed by the system 102 of FIG. 1. The method represented by the flow chart 200 may be performed by the computer 112, the HMD 114, or a combination thereof.

At 202, the system 102 obtains data indicating the gaze vector 172 of the user and the position 174 of the user. For example, the processor 122 receives the sensor data 162 from the HMD 114 via the I/O interface 130. As another example, the processor 122 receives the sensor data 162 from the HMD 114 via the network interface 128. The processor 122 generates (e.g., calculates) the gaze vector 172 of the user and the position 174 of the user based on the received sensor data 162. Alternatively, the processor 122 receives data indicating the gaze vector 172 of the user and the position 174 of the user via the I/O interface 130 or the network interface 128. To illustrate, the HMD 114 generates the gaze vector 172 and the position 174 of the user based on the sensor data 162 and the processor 122 receives the gaze vector 172 of the user and the position 174 of the user, i.e., data indicating the gaze vector 172 of the user and the position 174 of the user.

At 204, the system 102 determines a component vector 176 for a virtual component 132 (e.g., a simulated hardware component) of the VR application 126 based on the position 174 of the user and a position of the virtual component 132. For example, the processor 122 determines the component vector 176 for a particular virtual component 132 based on the position 174 of the user and a center point (e.g., a center point 762 of FIG. 7) of the particular virtual component 132.

At 206, the system 102 calculates an alignment value 178 based on the gaze vector 172 and the component vector 176. For example, the processor 122 calculates the alignment value 178 for the particular virtual component 132 based on a dot product of the gaze vector 172 and the component vector 176 for the particular virtual component 132. To illustrate, the processor 122 converts (e.g., normalizes) the gaze vector 172 and the component vector 176 into unit vectors and calculates the alignment value 178 for the particular virtual component 132 based on a dot product of the unit vector of the gaze vector 172 (i.e., the gaze vector 172 in unit vector notation) and the unit vector of the component vector 176 (i.e., the component vector 176 in unit vector notation) for the particular virtual component 132. Alternatively, one or more of the gaze vector 172 and the component vector 176 were previously determined or generated as unit vectors and the processor 122 calculates the alignment value 178 based on a dot product of the gaze vector 172 and/or the component vector 176.

At 208, the system 102 scales the alignment value 178 to generate a scaled alignment value 278. For example, the processor 122 scales a raw alignment value (e.g., the alignment value 178) to generate the scaled alignment value 278. The alignment value 178 can be scaled linearly or non-linearly to generate the scaled alignment value 278. Scaling the alignment value 178 enables the system 102 to adjust (e.g., reduce) simulation proportionally for components that are farther away from a center of the user's gaze and may provide finer control than adjusting (e.g., reducing) based on areas or sections. In a particular example, a scaling factor used for scaling the alignment value 178 or method used to calculate the scaled alignment value 278 is based on limits or boundary of vision of the user. To illustrate, the scaling factor can be determined to scale the alignment value 178 based on a user's reduction in visual clarity for objects outside the center of vision of the user.

As an illustrative, non-limiting example, when applying linear scaling, the alignment value 178 may be scaled to a value within a range of (and including) zero to one. When the gaze vector 172 and the component vector 176 are unit vectors, the alignment value 178 may have a range of (and including) negative one to one. In this example, the scaled alignment value 278 (e.g., a linear scaled alignment value) can be calculated, for example, adding one to the alignment value 178 and dividing the resulting sum by two.

As another illustrative, non-limiting example, when applying non-linear scaling, the alignment value 178 can be scaled to a value within a range of (and including) zero to one. When the gaze vector 172 and the component vector 176 are unit vectors, the alignment value 178 can have a range of (and including) negative one to one. The alignment value 178 may be linearly scaled, as described above, to an intermediate value, and then the intermediate value can be non-linearly scaled by logarithmic equations (e.g., logarithms of base 10, 2, e, ⅒, or ½, etc.) or exponential equations to generate the scaled alignment value 278 (e.g., a non-linear scaled alignment value). Applying such non-linear scaling better correlates the scaling and the resulting scaled alignment value 278 to match or approximate how a user perceives objects (e.g., detail and brightness of the object) outside of the center of gaze of the user.

At 210, the system 102 determines whether the virtual component 132 has a face plane 282. For example, the processor 122 determines whether the particular virtual component 132 has or is associated with a face plane 282. If the particular virtual component 132 is associated with a face plane 282, data identifying or enabling rendering of the face plane 282 is stored in the memory 124 or the VR application 126. Additionally or alternatively, the processor 122 can generate (e.g., calculate) the face plane 282 based on boundaries of the particular virtual component 132. For example, the processor 122 generates the face plane 282 based on coordinates of corners of a surface of the particular virtual component 132 in the virtual environment.

At 212, the system 102, in response to determining that the virtual component 132 has the face plane 282, determines a visible area 284 of the face plane 282 of the virtual component 132 based on the gaze vector and corners of the face plane 282. For example, the processor 122 calculates the visible area 284 (with respect to the user/gaze vector) of the face plane 282 of the particular virtual component 132 based on projecting the face plane 282 onto a gaze plane of the user, as described further with reference to FIG. 7.

At 214, the system 102 calculates a throttle value 182 based on the visible area 284 of the face plane 282 and the alignment value 178. For example, the processor 122 calculates the throttle value 182 based on a product of the scaled alignment value 278 (or the alignment value 178) and the visible area 284. In a particular implementation, the processor 122 further calculates the throttle value 182 by applying a constant or a function to the product of the scaled alignment value 278 and the visible area 284. Applying the constant or function to the throttle value 182 can produce a simulation level value. The simulation setting 136 (i.e., fidelity of simulation) of the virtual component 132 is adjusted based on the simulation level value.

In some implementations, the system 102 uses a method of Inter Process Communication (IPC) to assign a simulation value (e.g., adjust or set a value of the simulation programming 134, the simulation settings 136, or the simulation thresholds 138) to the particular virtual component 132 based on the throttle value 182. Assigning the simulation value to the particular virtual component 132 adjusts the fidelity of the particular virtual component 132. Accordingly, the fidelity of the VR application 126 is adjusted and an amount of processing and computing resources used by the system 102 is adjusted, such as processing and computing resources of the computer 112.

As illustrated in FIG. 2, the system 102, at 216, assigns a critical section mutual exclusion (mutex) value 292 to the virtual component 132 based on the throttle value 182. For example, the processor 122 sets the critical section mutex value 292 to a value of the throttle value 182 and adjusts one or more of the simulation programming 134, the simulation settings 136, or the simulation thresholds 138 of the particular virtual component 132 based on the critical section mutex value 292. Other methods of IPC can be used to assign a simulation value, such as: (1) sending (e.g., passing), using a message queue, a message from the foveated simulation process to the simulation programming 134; or, (2) sending, using a network socket interface, a TCP message to the simulation programming 134.

Alternatively, in response to determining that the virtual component 132 does not have the face plane 282, the system 102 proceeds to step 216 and assigns the scaled alignment value 278 (or the alignment value 178) to virtual component 132 using a method of IPC. For example, the processor 122 sets the critical section mutex value 292 to a value of the scaled alignment value 278 and adjusts one or more of the simulation programming 134, the simulation settings 136, or the simulation thresholds 138 of the particular virtual component 132 based on the critical section mutex value 292.

When the virtual component 132 is or includes a virtual display, adjusting the simulation of the virtual display includes reducing a resolution of the virtual display, reducing a refresh rate of the virtual display to the virtual environment, reducing a rendering frame rate (e.g., frame per second (FPS)) associated with the virtual display, or a combination thereof.

A control loading system is configured to provide users (e.g., pilots) with realistic flight control forces in a flight simulator or training device. The control loading system receives inputs from the VR application 126 (e.g., the flight simulator) and the user, and provides outputs to the VR application 126 (e.g., the flight simulator) and the user. The inputs include application of force and aircraft states, and the outputs include flight control position and forces.

When the virtual component 132 is a control loading system, adjusting the simulation of the control loading system includes reducing a simulation level of the control loading system, such as by using programming shortcuts (e.g., skipping steps or routines) or by using approximations (e.g., using alternate code to reduce processing resources or computer resources). When the virtual component 132 is an inceptor (e.g., a control input device to direct and maneuver the aircraft), adjusting the simulation of the inceptor includes reducing a processing frequency (e.g., update frequency) associated with the inceptor. For example, sensors of the inceptor which determine a position of the inceptor are updated at a higher or lower frequency.

Steps 204-216 (as illustrated in a dashed box 222) can be repeated for each virtual component 132 of the VR application 126 or for select virtual components 132 of the VR application 126. For example, the processor 122 may select one or more particular component types for foveated simulation, as described further with reference to FIGS. 3-4.

FIGS. 3-6 are diagrams that illustrate particular examples of a visual rendering of a virtual environment 302 of the VR application 126. The visual rendering may be output by the display 142 of the HMD 114 or another display device coupled to the computer 112.

Figure 3:
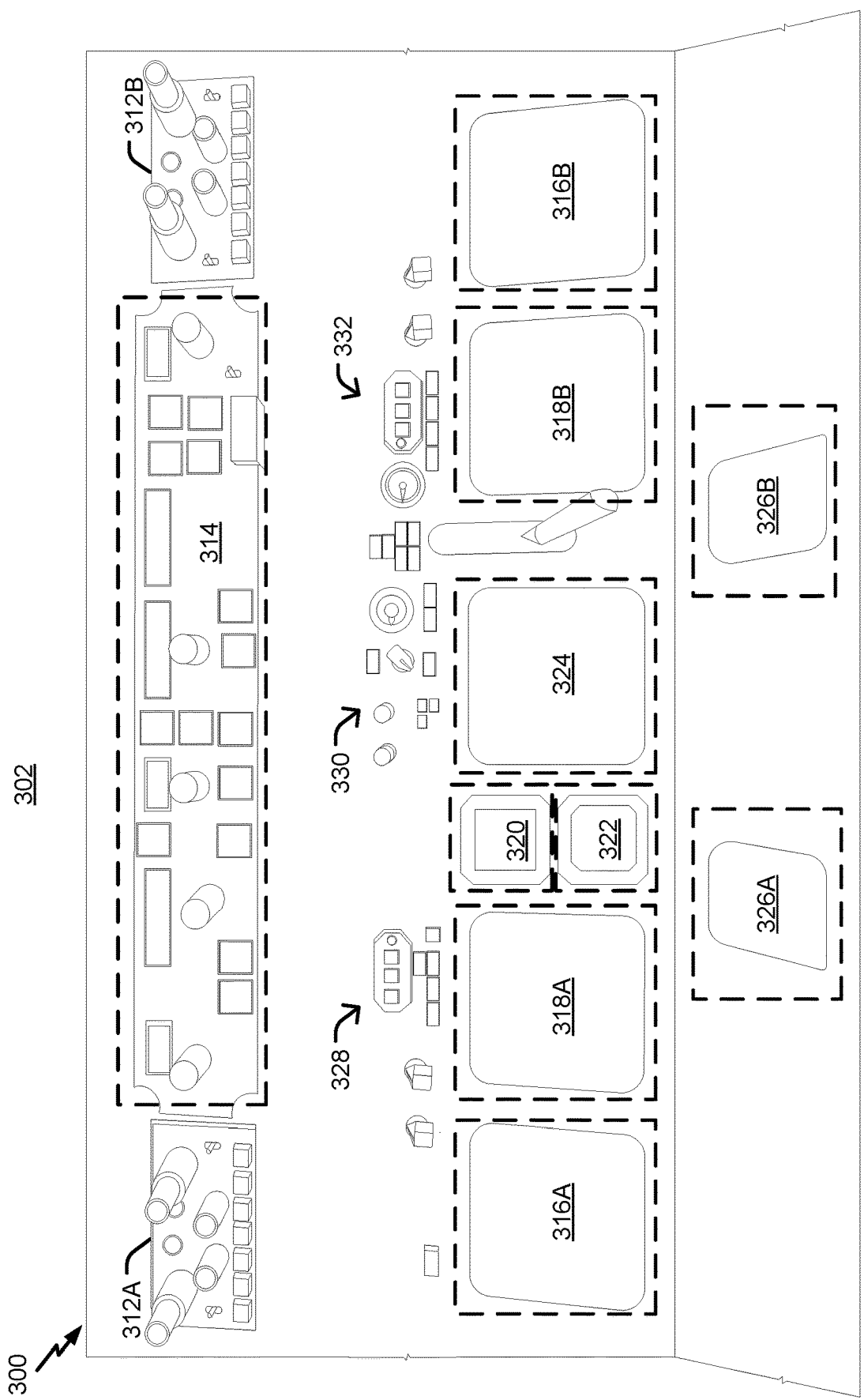
FIG. 3 is a diagram that illustrates an example of a virtual environment of a VR application of FIG. 1.

FIG. 3 is a diagram 300 that illustrates an example of the virtual environment 302 of the VR application 126 of FIG. 1. In FIG. 3, the virtual environment 302 includes a plurality of virtual components 132, such as virtual components 312-332. The virtual components 132 include Electronics Flight Instrumentation System (EFIS) Control Panels 312, a Mode Control Panel 314, EFIS Primary Function Displays (PFDs) 316, EFIS Navigation Displays 318, a Standby Flight Display (ISFD) 320, a Radio Magnetic Indicator (RMI) 322, an Engine Multi Function Display (MFD) 324, Multi Function Control Display Units (MCDUs) 326, a first instrument cluster 328, a second instrument cluster 330, and a third instrument cluster 332. As illustrated in FIG. 3, the virtual environment 302 may have multiple instances of a particular virtual component 132. For example, the virtual environment 302 has a first (e.g., left) EFIS Control Panel 312A and a second (e.g., right) EFIS Control Panel 312B, a first (e.g., left) EFIS PFD 316A and a second (e.g., right) EFIS PFD 316B, a first (e.g., left) EFIS Navigation Display 318A and a second (e.g., right) EFIS Navigation Display 318B, and a first (e.g., left) MCDU 326A and a second (e.g., right) MCDU 326B.

The virtual components 312, 314, 328, 330, and 332 correspond to controls, such as virtual control panels, switches, inceptors, etc. The virtual components 316-326 correspond to displays, i.e., virtual displays.

In some implementations, the system 102 of FIG. 1 performs foveated simulation based on virtual component types. For example, the processor 122 first performs foveated simulation for virtual displays when available resources are less than a first threshold (e.g., a highest threshold), performs foveated simulation for virtual displays and virtual controls when available resources are less than a second threshold (e.g., an intermediate threshold), and performs foveated simulation for virtual displays, virtual controls, and high acuity components and/or critical components when available resources are less than a third threshold (e.g., a lowest threshold). High acuity components include components with bright or flashing lights, and critical components include components which are time sensitive (alarms, warnings, notifications, interconnected components, etc.).

Figure 4:
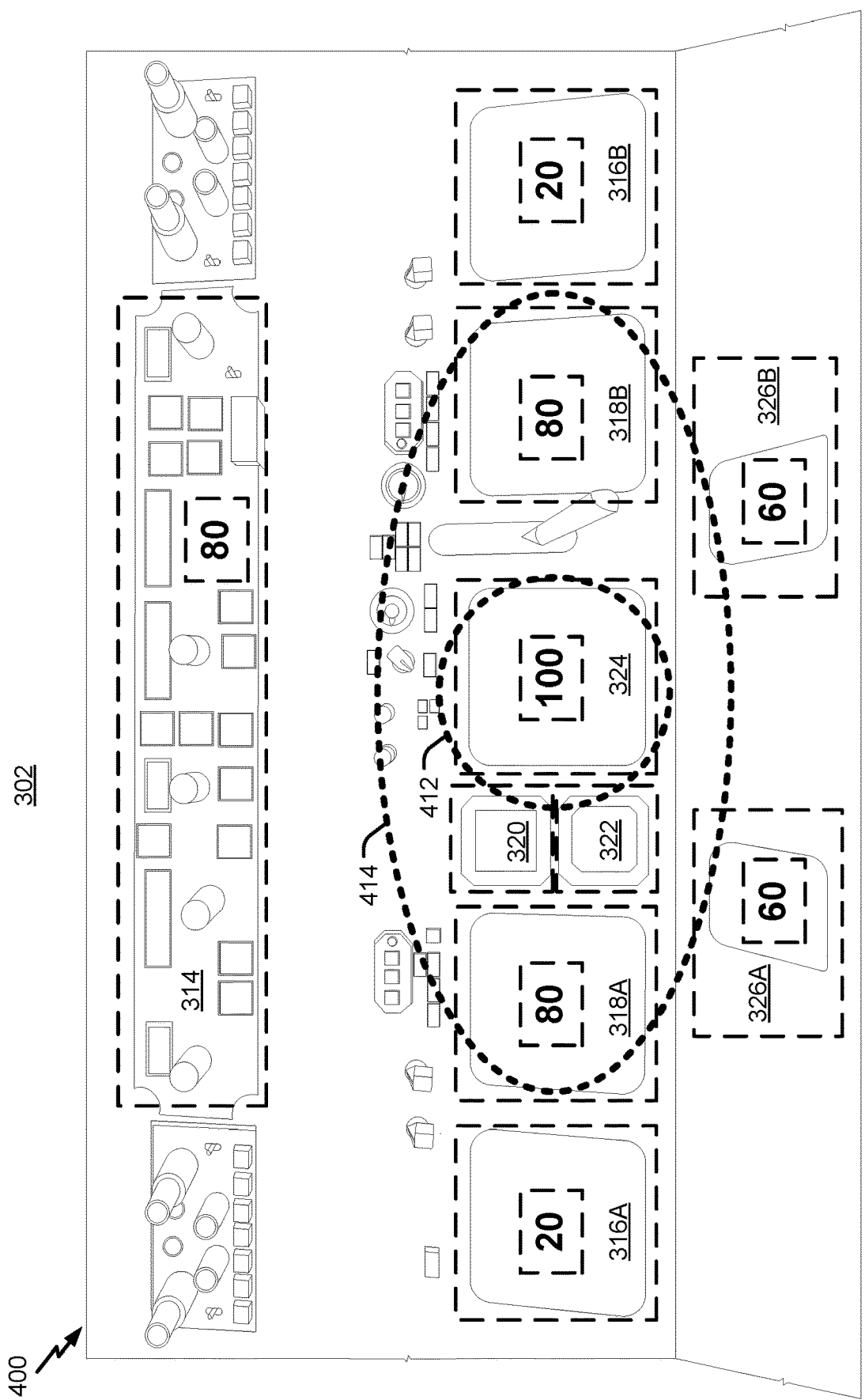
FIG. 4 is a diagram that illustrates another example of the virtual environment of FIG. 3.
Figure 5:
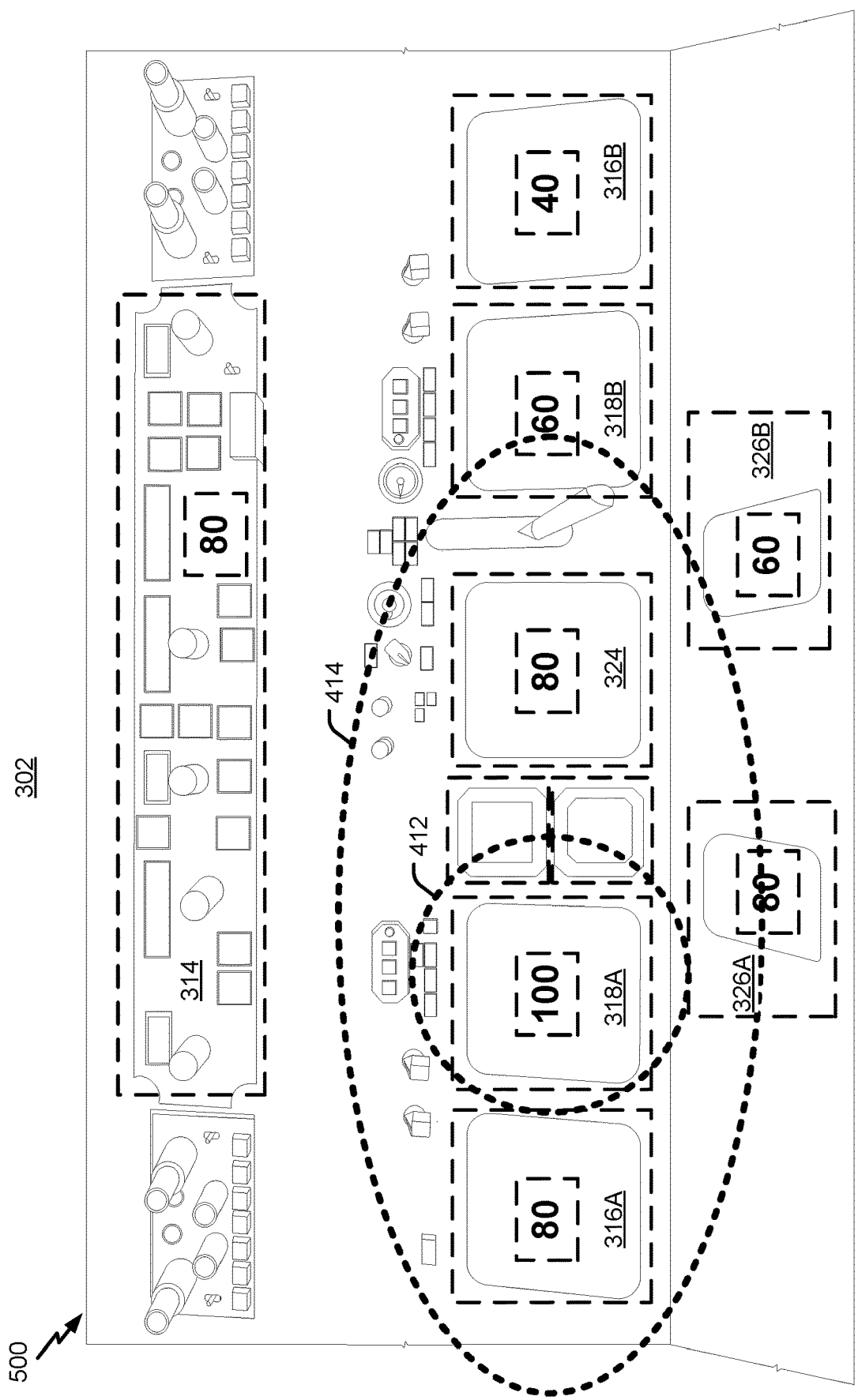
FIG. 5 is a diagram that illustrates another example of the virtual environment of FIG. 3.
Figure 6:
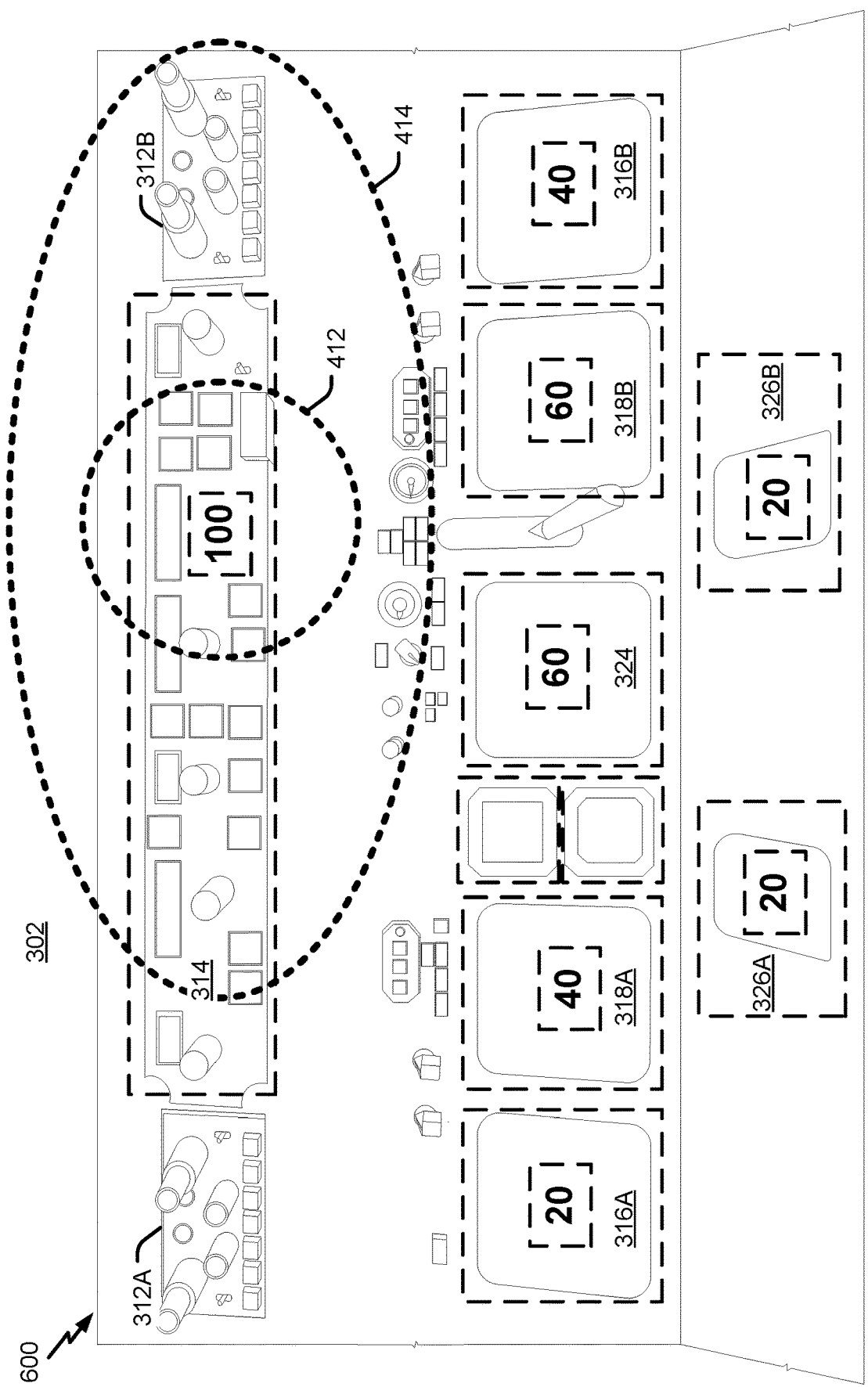
FIG. 6 is a diagram that illustrates another example of the virtual environment of FIG. 3.

In some implementations, the processor 122 performs foveated simulation for areas or regions of the virtual environment 302 of the VR application 126, as described further with reference to FIGS. 4-6.

FIG. 4 is a diagram 400 that illustrates another example of the virtual environment 302 of FIG. 3. FIG. 4 depicts a user's view while looking at a first portion of the virtual environment 302, such as a central portion of the virtual environment 302. For example, a gaze vector 172 for the example illustrated in FIG. 4 would indicate that the user is looking in a direction that coincides with the Engine MFD 324. In some implementations, the system 102 of FIG. 1 partitions the virtual environment 302 into regions and/or generates one or more areas, such as first area 412 and a second area 414, based on the gaze vector 172. As illustrated in FIG. 4, the first area 412 is a circle and the second area 414 is an ellipse.

The system 102 can perform foveated simulation based on the regions and/or the areas. For example, the system 102 can set different levels of simulation for components in different areas. To illustrate, the system 102 sets the virtual components 132 within the first area 412 to a first level of simulation, sets the virtual components 132 within the second area 414 (and outside of the first area 412) to a second level of simulation, and sets virtual components outside of the second area 414 to a third level of simulation.

As a non-limiting example, in FIG. 4, the Engine MFD 324 has a simulation setting 136 of 100 percent (e.g., a base value), the first EFIS Navigation Display 318A and the second EFIS Navigation Display 318B have a simulation setting 136 of 80 percent, and the first EFIS PFD 316A and the second EFIS PFD 316B have a simulation setting 136 of 20 percent. In the example of FIG. 4, a fourth level of simulation (e.g., the simulation setting 136 of 60 percent) can be used for the first MCDU 326A and the second MCDU 326B since a minor portion of each is within the second area 414. To illustrate, the alignment values 178 (or the scaled alignment values 278 or the throttle values 182) of the virtual components 132 are within a range of values that correspond to a particular simulation setting 136. For example, the first EFIS Navigation Display 318A and the second EFIS Navigation Display 318B have alignment values 178 that are below a first simulation threshold 138 and above a second simulation threshold 138, and the first EFIS PFD 316A and the second EFIS PFD 316B have alignment values 178 that are below the second simulation threshold 138 and above a third simulation threshold 138.

Additionally, particular virtual components 132 of the virtual environment 302 may have simulation settings 136 based on simulation thresholds 138 or type of component. For example, the Mode Control Panel 314 can be set to the second level (e.g., the simulation setting 136 of 80 percent) even though the Mode Control Panel 314 is outside of the second area 414 because of a setting associated with the Mode Control Panel 314. To illustrate, the Mode Control Panel 314 has a simulation threshold 138 corresponding to a particular simulation level or simulation value (e.g., the second level or 80 percent). Although, the simulation settings 136 of the ISFD 320 and the RMI 322 are not illustrated in FIG. 4, the ISFD 320 and the RMI 322 have a simulation setting 136 of 80 percent because the ISFD 320 and the RMI 322 are completely within the second area 414, and only partially within the first area 412.

FIG. 5 is a diagram 500 that illustrates another example of the virtual environment 302 of FIG. 3. FIG. 5 depicts the user's view while looking at a second portion of the virtual environment 302, such as a left middle portion of the virtual environment 302. The system 102 adjusts (e.g., reduces or increases) simulation settings 136 of the virtual components 132 based on the updated user gaze position.

In the non-limiting example of FIG. 5, the first EFIS Navigation Display 318A has a simulation setting 136 of 100 percent (e.g., the base value) since the first EFIS Navigation Display 318A is within a central region (e.g., the first area 412) of the user's view. In this example, the first EFIS PFD 316A and the Engine MFD 324 have a simulation setting 136 of 80 percent since they are within a near central region (e.g., the second area 414) of the user's view and the alignment values 178 (or scaled alignment values 278) are higher relative to the other virtual components 132. In some implementations, the first MCDU 326A can also have the simulation setting of 80 percent since approximately half of its rendered area is within the near central region of the user's view. The second EFIS Navigation Display 318B and the second MCDU 326B have a simulation setting 136 of 60 percent since they partially overlap a portion of the near central region and the alignment values 178 (or scaled alignment values 278) are lower relative to the first EFIS PFD 316A and the Engine MFD 324. The second EFIS PFD 316B has a simulation setting 136 of 40 percent since the second EFIS PFD 316B does not overlap the near central region and is farthest away from the central region. Thus, in the example of FIG. 5, the simulation setting 136 of the Engine MFD 324 is reduced (relative to FIG. 4) and the simulation setting 136 of first EFIS Navigation Display 318A is increased (relative to FIG. 4) as based on the change in the user's view.

FIG. 6 is a diagram 600 that illustrates another example of the virtual environment 302 of FIG. 3. FIG. 6 depicts the user's view while looking at a third portion of the virtual environment 302, such as a top right portion of the virtual environment 302. The system 102 adjusts (e.g., reduces or increases) simulation settings 136 of the virtual components 132 based on the updated user gaze position.

In the non-limiting example of FIG. 6, the Mode Control Panel 314 has a simulation setting 136 of 100 percent (e.g., the base value) since the Mode Control Panel 314 is within a central region (e.g., the first area 412) of the user's view. In this example, the second EFIS Navigation Display 318B and the Engine MFD 324 have a simulation setting 136 of 60 percent since they are near (e.g., beneath) the central region of the user's view and the alignment values 178 (or scaled alignment values 278) are higher relative to the first EFIS PFD 316A, the second EFIS PFD 316B, the first EFIS Navigation Display 318A, the first MCDU 326A, and the second MCDU 326B. The second EFIS PFD 316B and the first EFIS Navigation Display 318A have a simulation setting 136 of 40 percent since they are near (e.g., beneath) extremes of the central region and the alignment values 178 (or scaled alignment values 278) are lower relative to the second EFIS Navigation Display 318B and the Engine MFD 324. The first EFIS PFD 316A, the first MCDU 326A, and the second MCDU 326B have a simulation setting 136 of 20 percent since they do not overlap (e.g., partially contained within) the near central region and are furthest away from the central region. Thus, the first EFIS PFD 316A, the first MCDU 326A, and the second MCDU 326B have the lowest alignment values 178 (or scaled alignment values 278).

When throttle values 182 are used to adjust the simulation settings 136, the lower alignment values 178 (or scaled alignment values 278) will produce lower throttle values 182.

In the implementation illustrated in FIG. 6, the virtual components 132 corresponding to controls (e.g., the first EFIS Control Panel 312A and the second EFIS Control Panel 312B) are not adjusted. In other implementations, the virtual components 132 corresponding to controls (e.g., the first EFIS Control Panel 312A and the second EFIS Control Panel 312B) are adjusted. For example, the virtual components 132 corresponding to controls are adjusted based on control simulation levels, such as 100 percent, 50 percent, 25 percent, etc., as opposed to display simulation levels, such as 100, 80, 60, etc. Alternatively, the virtual components 132 corresponding to controls can be adjusted based on the display simulation levels for the virtual components 132 corresponding to displays. To illustrate, the first EFIS Control Panel 312A has a simulation setting 136 of 20 percent since the first EFIS Control Panel 312A does not overlap (e.g., partially contained within) the near central region and is furthest away from the central region, and the second EFIS Control Panel 312B has a simulation setting 136 of 80 percent since the second EFIS Control Panel 312B is within the near central region of the user's view.

Thus, in the examples of FIGS. 4-6, the simulation settings 136 of the virtual components 132 are adjusted based on the change in the user's view. Therefore, the system 102 can reduce and increase the simulation setting 136 of the virtual components 132 as the user views different portions of the virtual environment 302.

Figure 7:
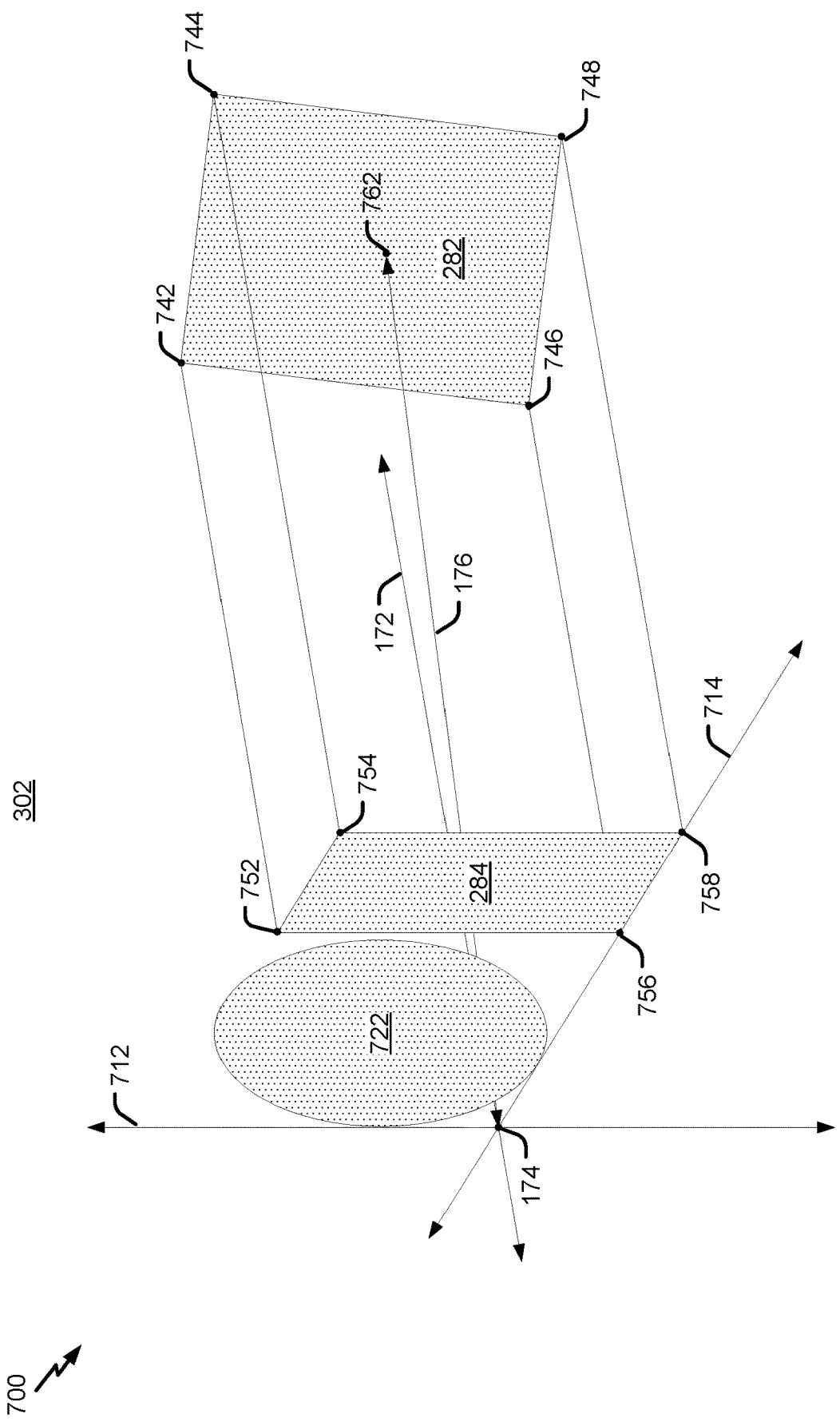
FIG. 7 is a diagram that illustrates examples of planes of the virtual environment of the VR application of FIG. 1.

FIG. 7 is a diagram 700 that illustrates examples of planes of a virtual environment 302 of the VR application 126 of FIG. 1. In FIG. 7, the virtual environment 302 depicts the gaze vector 172 and two vectors which are orthogonal to the gaze vector 172, i.e., orthogonal gaze vectors 712, 714. As illustrated in FIG. 7, the orthogonal gaze vectors 712, 714 include a first orthogonal gaze vector 712 (e.g., gaze vector up) and a second orthogonal gaze vector 714 (e.g., gaze vector right). The orthogonal gaze vectors 712, 714 define a gaze plane 722, and the gaze vector 172 is a normal vector of the gaze plane 722, that is a vector normal to the gaze plane 722.

A visible area 284 of a face plane 282 of a particular virtual component 132 can be calculated by projecting the face plane 282 onto the gaze plane 722, as illustrated in FIG. 7. The visible area 284 corresponds to an area of the face plane 282 as visible by the user. To project the face plane 282, multiple corners 742-748 of the face plane 282 are projected onto the gaze plane 722. For example, each of the corners 742, 744, 746 and 748 are projected onto the gaze plane 722 based on the orthogonal gaze vectors 712, 714 to generate corresponding corners 752, 754, 756, and 758. To illustrate, the processor 122 calculates a first coordinate (e.g., a x-axis coordinate) of a first corresponding corner 752 on the gaze plane 722 based on a dot product of the second orthogonal gaze vector 714 (e.g., gaze vector right) and a first corner 742 (i.e., a vector from an origin of the virtual environment to the corner) and a second coordinate (e.g., a y-axis coordinate) of the first corresponding corner 752 on the gaze plane 722 based on a dot product of the first orthogonal gaze vector 712 (e.g., gaze vector up) and the first corner 742. A similar process can be used for one or more of the corners 754, 756 and 758. The area of the visible area 284 can be calculated based on the corners 752, 754, 756, and 758.

In other implementations, less than all corners of the face place 282 are projected onto the gaze plane 722 to calculate the visible area 284. For example, when projecting a square face plane 282, three corners can be projected onto the gaze plane 722 and the fourth corner can be determined from the three projected corners.

FIG. 7 further illustrates a center point 762 of the face plane 282. The position 174 of the user and the center point 762 can be used to determine the component vector 176. In some implementations, the processor 122 determines the center point 762 based on the corners 742-748 of the virtual component 132.

Figure 8:
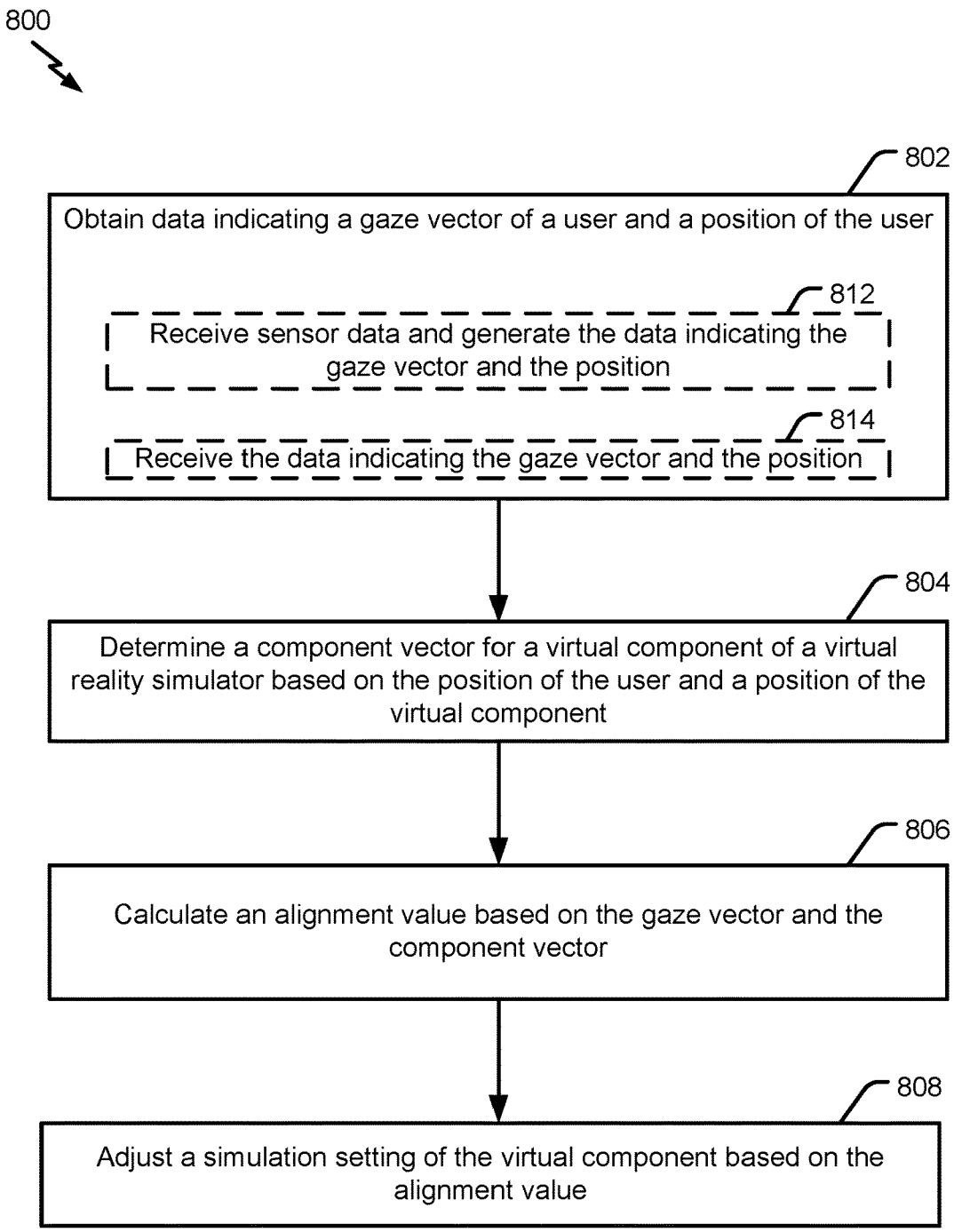
FIG. 8 is a flow chart of an example of a method of foveated simulation.

FIG. 8 illustrates a particular example of a method 800 of foveated simulation. The method 800 may be performed by the system 102 of FIG. 1, such as the computer 112, the HMD 114, or a combination thereof. The method 800 includes, at 802, obtaining data indicating a gaze vector of a user and a position of the user. For example, the data may include or correspond to the sensor data 162, the gaze vector 172, or the position 174 of FIG. 1. To illustrate, the processor 122 obtains the gaze vector 172 and the position 174 of the user, as described with reference to FIG. 1.

In some implementations, obtaining 802 includes receiving 812 the sensor data and generating the data indicating the gaze vector and the position. To illustrate, the processor 122 receives the sensor data 162 from the HMD 114 via the I/O interface 130 or the network interface 128, and the processor 122 generates the gaze vector 172 and the position 174 based on the sensor data 162.

In other implementations, obtaining 802 includes receiving 814 the data indicating the gaze vector and the position. For example, the HMD 114 processes the sensor data 162 to determine the gaze vector 172 and the position 174, and the processor 122 receives data indicating the gaze vector 172 and the position 174 from the HMD 114.

The method 800 also includes, at 804, determining a component vector for a virtual component of a virtual reality simulator based on the position of the user and a position of the virtual component. For example, the component vector may include or correspond to the component vector 176 of FIG. 1. To illustrate, the processor 122 determines the component vector 176 for the virtual component 132 based on the position 174 of the user and the center point 762 of the face plane 282 of the virtual component 132. In some implementations, the component vector 176 is determined as a unit vector or is converted or normalized into a unit vector. In a particular implementation, the processor 122 calculates the center point 762 based on multiple corners 742-748 of the virtual component 132.

The method 800 includes, at 806, calculating an alignment value based on the gaze vector and the component vector. For example, the alignment value may include or correspond to the alignment value 178 of FIG. 1 or the scaled alignment value 278 of FIG. 2. To illustrate, the processor 122 calculates the alignment value 178 based on the gaze vector 172 and the component vector 176, such as a dot product of the gaze vector 172 and the component vector 176. In some implementations, the processor 122 scales the alignment value 178 to generate the scaled alignment value 278, as described with reference to FIG. 2.

The method 800 further includes, at 808, adjusting a simulation setting of the virtual component based on the alignment value. For example, the simulation setting may include or correspond to the simulation setting 136 of FIG. 1. To illustrate, the processor 122 adjusts the simulation setting 136 of the virtual component 132 based on the alignment value 178 or the scaled alignment value 278, which is itself generated based on the alignment value 178. In some implementations, the processor 122 adjusts the simulation setting 136 of the virtual component 132 based on the value of the alignment value 178 or the scaled alignment value 278. In other implementations, the processor 122 calculates the throttle value 182 based on the alignment value 178 or the scaled alignment value 278 and the visible area 284 of the virtual component 132. In such implementations, processor 122 adjusts the simulation setting 136 of the virtual component 132 based on the throttle value 182, as described with reference to FIG. 2.

Using a value of the throttle value 182 to adjust simulation setting 136 of the virtual component 132 accounts for the visible area 284 of the virtual component 132, as compared to using a value of the alignment value 178 or the scaled alignment value 278. Thus, virtual components 132 that appear larger to the user will have less of a reduction in simulation as compared to smaller virtual components 132 for similar alignment values 178 or scaled alignment values 278. However, using the value of the throttle value 182 to adjust the simulation setting 136 of the virtual component 132 utilizes more system resources, as compared to using the value of the alignment value 178 or the scaled alignment value 278.

In some implementations, the method 800 includes defining a first virtual area of the virtual reality simulator based on the gaze vector and defining a second virtual area of the virtual reality simulator based on the gaze vector. In a particular implementation, the first virtual area is a circle and the second area virtual is an ellipse, and the second virtual area is larger than the first virtual area, as described with reference to FIGS. 4-6. Such an arrangement of the virtual areas more closely mirrors how a user's vision perceives detail. In such implementations, the method 800 further includes applying first simulation settings to first virtual components located within the first virtual area, second simulation settings to second virtual components located outside of the first virtual area and located within the second virtual area, and third simulation settings to third virtual components located outside of the first virtual area and the second virtual area, as described with reference to FIGS. 4-6. The virtual component can be part of the first virtual components, the second virtual components, the third virtual components, or separate from the first, second, and third virtual components.

In some implementations, the method 800 includes determining available resources of the processor, the computer, or both. The method 800 also includes determining whether the available resources of the processor, the computer, or both, are greater than a simulation threshold. The method 800 further includes, based on determining that the available resources of the processor, the computer, or both, are greater than the simulation threshold, adjusting the simulation setting of the virtual component to a base value. Alternatively, the method 800 includes, based on determining that the available resources of the processor, the computer, or both, are less than or equal to the simulation threshold, adjusting the simulation setting of the virtual component based on a throttle value. In some implementations, the method 800 further includes one or more operations described with reference to FIG. 1, the flow chart 200 of FIG. 2, or a combination thereof.

The method 800 of FIG. 8, may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 800 of FIG. 8 can be initiated or controlled by one or more processors, such as one or more processors included in a control system. In some implementations, a portion of the method 800 of FIG. 8 may be combined with one or more operations of the flow chart 200 of FIG. 2. Additionally, one or more operations described with reference to FIG. 8 may be optional and/or may be performed in a different order than shown or described. Two or more operations described with reference to FIG. 8 may be performed at least partially concurrently.

Figure 9:
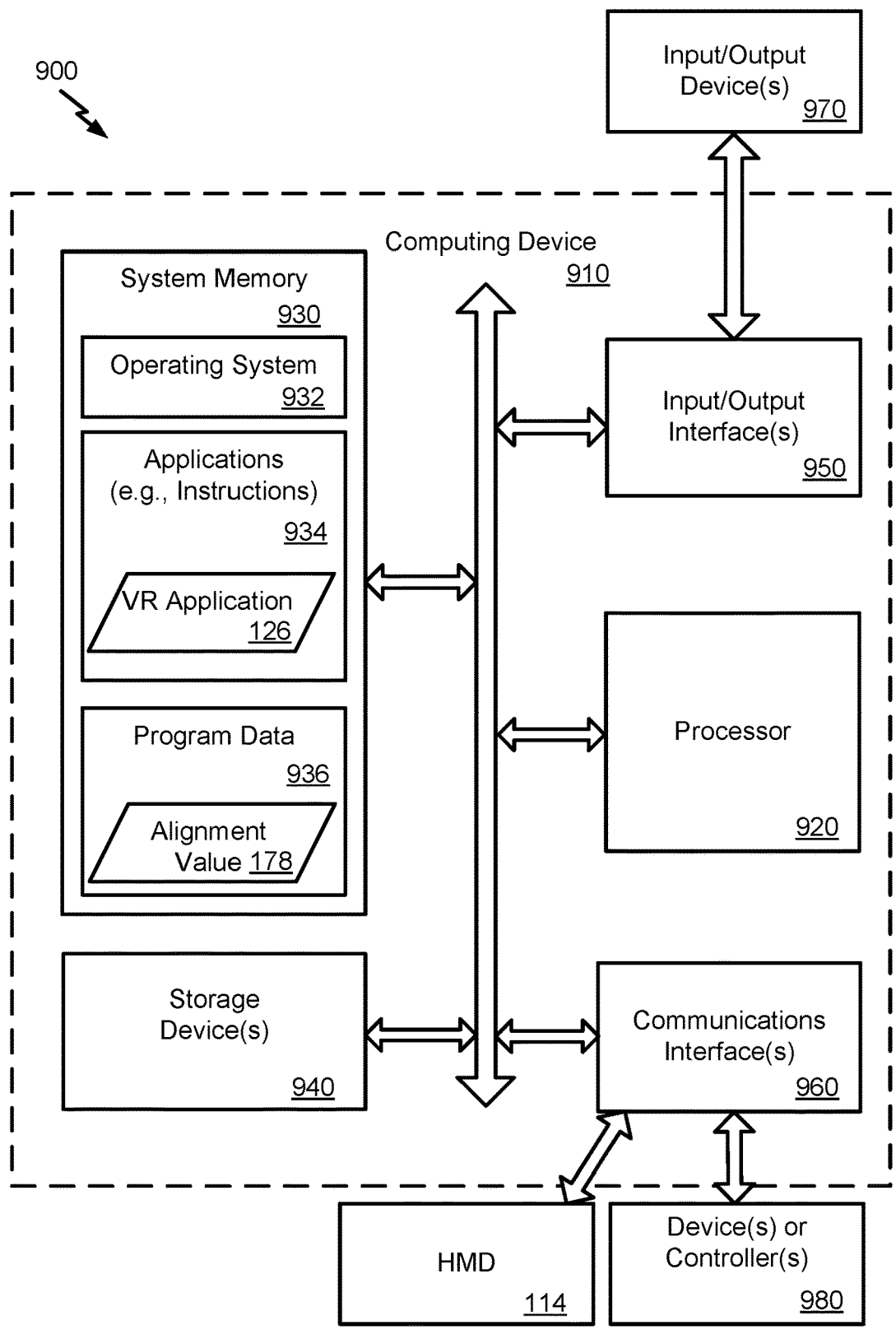
FIG. 9 is a block diagram of a particular example of a computing environment configured to support foveated simulation according to the present disclosure.

FIG. 9 is an illustration of a block diagram of a computing environment 900 including a general purpose computing device 910 configured to support embodiments of computer-implemented methods and computer-executable program instructions (or code) according to the present disclosure. For example, the computing device 910, or portions thereof, may execute instructions to perform the functions of the system 102 or functions of a portion of the system 102, such as the computer 112 or the HMD 114. The instructions to control the system 102 (or of a portion of the system 102, such as the computer 112 or the HMD 114) may include instructions to perform operations of obtaining data indicating a gaze vector of a user and a position of the user. The instructions to control the system 102 (or the portion of the system 102) may also include instructions to perform operations of determining a component vector for a virtual component of a virtual reality simulator based on the position of the user and a position of the virtual component. The instructions to control the system 102 (or the portion of the system 102) may include instructions to perform operations of calculating an alignment value based on the gaze vector and the component vector. The instructions to control the system 102 (or the portion of the system 102) may further include instructions to perform operations of adjusting a simulation setting of the virtual component based on the alignment value. The computing device 910, or portions thereof, may further execute instructions to perform operations according to any of the flow charts and/or methods described herein, such as the flow chart 200 of FIG. 2, the method 800 of FIG. 8, or a combination thereof.

The computing device 910 includes a processor 920. The processor 920 communicates with the system memory 930, one or more storage devices 940, one or more input/output interfaces 950, one or more communications interfaces 960, or a combination thereof. In a particular embodiment, the processor 920 includes or corresponds to the processor 122 of the computer 112 or a processor of the HMD 114. The system memory 930 includes volatile memory devices (e.g., random access memory (RAM) devices), nonvolatile memory devices (e.g., read-only memory (ROM) devices, programmable read-only memory, and flash memory), or both. The system memory 930 includes an operating system 932, which may include a basic input/output system for booting the computing device 910 as well as a full operating system to enable the computing device 910 to interact with users, other programs, and other devices. The system memory 930 includes one or more applications 934 which are executable by the processor 920. For example, the one or more applications 934 include instructions executable by the processor 920 to control the system 102 to perform foveated simulation. To illustrate, the one or more applications 934 include the VR application 126.

The processor 920 also communicates with one or more storage devices 940, such as the memory 124 of FIG. 1. For example, the one or more storage devices 940 can include nonvolatile storage devices, such as magnetic disks, optical disks, or flash memory devices. The storage devices 940 can include both removable and non-removable memory devices. The storage devices 940 can be configured to store an operating system, images of operating systems, applications, and program data 936, such as the alignment value 178. The storage devices 940 can also store the simulation programming 134, the simulation settings 136, and/or the simulation thresholds 138. In a particular embodiment, the system memory 930, the storage devices 940, or both, include tangible computer-readable media.

The processor 920 communicates with one or more input/output interfaces 950 that enable the computing device 910 to communicate with one or more input/output devices 970 (such as the input devices 116 or the display 142 of FIG. 1) to facilitate user interaction. The input/output interfaces 950 can include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 970 can include keyboards, pointing devices, displays, speakers, microphones, touch screens, and other devices. The processor 920 detects interaction events based on user input received via the input/output interfaces 950. Additionally, the processor 920 send a display to a display device (e.g., the display 142) via the input/output interfaces 950.

The processor 920 can communicate with the HMD 114, one or more devices 980, or a combination thereof, via the one or more communications interfaces 960. The one or more communications interfaces 960 may include wired Ethernet interfaces, IEEE 802 wireless interfaces, other wireless communication interfaces, or other network interfaces. The one or more devices 980 can include host computers, servers, workstations, and other computing devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system, comprising:
    a head mounted display (HMD) configured to generate sensor data indicative of a gaze vector of a user and a position of the user;
    a processor configured to communicate with the HMD; and
    a memory coupled to the processor, the memory storing instructions that, when executed by the processor, cause the processor to:
    determine a component vector for a virtual component of a virtual reality simulator based on the position of the user and a position of the virtual component;
    determine whether the virtual component has a face plane;
    in response to determining that the virtual component has the face plane, calculate a visible area of the face plane of the virtual component based on the gaze vector and a plurality of corners of the face plane;
    calculate a first alignment value based on the gaze vector and the component vector;
    calculate a throttle value by applying a constant or a function to a product of a second alignment value and the visible area of the face plane to produce a simulation level value, wherein the second alignment value has been determined based on the first alignment value; and
    adjust a simulation setting of the virtual component based on the simulation level value.

2. The system of claim 1, wherein the HMD is configured to generate data indicating the gaze vector and the position of the user based on the sensor data, and wherein the instructions further cause the processor to receive the data indicating the gaze vector and the position from the HMD.

3. The system of claim 1, wherein the instructions further cause the processor to:
    receive the sensor data from the HMD; and
    determine the gaze vector and the position of the user based on the sensor data.

4. The system of claim 1, wherein the instructions further cause the processor to apply non-linear scaling to the first alignment value to generate a non-linear scaled alignment value, and wherein the second alignment value includes the non-linear scaled alignment value.

5. The system of claim 1, wherein calculating the visible area of the face plane of the virtual component includes:
    for multiple corners of the plurality of corners of the face plane, projecting a corresponding corner on a gaze plane associated with the user based on a first orthogonal gaze vector, a second orthogonal gaze vector, and the corner of the face plane; and
    calculating the visible area of the face plane of the virtual component based on the multiple corners of the gaze plane.

6. The system of claim 1, wherein the instructions further cause the processor to:
    define a first virtual area of the virtual reality simulator based on the gaze vector;
    define a second virtual area of the virtual reality simulator based on the gaze vector, wherein the first virtual area is a circle and the second area virtual is an ellipse, and wherein the second virtual area is larger than the first virtual area; and apply first simulation settings to first virtual components located within the first virtual area, second simulation settings to second virtual components located outside of the first virtual area and located within the second virtual area, and third simulation settings to third virtual components located outside of the first virtual area and the second virtual area.

7. The system of claim 1, wherein the instructions further cause the processor to use Inter Process Communication to assign a critical section mutual exclusion value to the virtual component based on the throttle value.

8. The system of claim 1, wherein the first alignment value is a raw alignment value, and wherein the instructions further cause the processor to scale the raw alignment value to generate a scaled alignment value, and wherein the second alignment value includes the scaled alignment value.

9. The system of claim 1, further comprising:
a first input/output (I/O) interface coupled to the HMD; and
a second (I/O) interface coupled to the processor, the second (I/O) interface configured to receive the sensor data from the first I/O interface of the HMD or configured to receive data indicating the gaze vector and the position of the user from the first I/O interface of the HMD.

10. The system of claim 1, further comprising one or more input devices coupled to the processor, the one or more input devices including one or more inceptors, a control yoke, one or more rudder pedals, one or more instrument panels, a collective, a cyclic, or a combination thereof.

11. A device, comprising:
a processor; and
a memory coupled to the processor, the memory storing instructions that, when executed by the processor, cause the processor to:
obtain data indicating a gaze vector of a user and a position of the user;
determine a component vector for a virtual component of a virtual reality simulator based on the position of the user and a position of the virtual component;
calculate a first alignment value based on the gaze vector and the component vector;
adjust a simulation setting of the virtual component based on the first alignment value; and
adjust a simulation setting of a second component of the virtual reality simulator based on a second alignment value.

12. The device of claim 11, wherein the instructions further cause the processor to: determine available resources of the processor;
determine whether the available resources of the processor are greater than a simulation threshold; and
based on determining that the available resources of the processor are greater than the simulation threshold, adjust the simulation setting of the virtual component to a base value.

13. The device of claim 11, wherein the instructions further cause the processor to apply non-linear scaling to the first alignment value to generate a non-linear scaled alignment value, wherein the simulation setting of the virtual component is adjusted based on the non-linear scaled alignment value, and wherein the second alignment value includes the non-linear scaled alignment value.

14. The device of claim 11, wherein the instructions further cause the processor to:
define a first virtual area of the virtual reality simulator based on the gaze vector;
define a second virtual area of the virtual reality simulator based on the gaze vector, wherein the first virtual area is a circle and the second virtual area is an ellipse, and wherein the second virtual area is larger than the first virtual area; and
apply first simulation settings to first virtual components located within the first virtual area, second simulation settings to second virtual components located outside of the first virtual area and located within the second virtual area, and third simulation settings to third virtual components located outside of the first virtual area and the second virtual area.

15. The device of claim 11, wherein the virtual component is a virtual display of the virtual reality simulator, and wherein adjusting the simulation of the virtual display includes reducing a resolution of the virtual display, reducing a refresh rate of the virtual display, reducing a rendering frame rate associated with the virtual display, or a combination thereof.

16. The device of claim 11, wherein the virtual reality simulator is a flight simulator, wherein the virtual component is an inceptor, and wherein adjusting the simulation of the inceptor includes reducing a processing frequency associated with the inceptor.

17. The device of claim 11, wherein the virtual component is a control loading system, and wherein adjusting the simulation of the control loading system includes reducing a simulation level of the control loading system.

18. A computer-readable storage device comprising instructions, that when executed, cause a processor to perform operations comprising:
obtaining data indicating a gaze vector of a user and a position of the user, wherein the gaze vector is a unit vector;
determining a component vector for a virtual component of a virtual reality simulator based on the position of the user and a position of the virtual component, wherein the component vector is a unit vector;
calculating an alignment value based on a dot product of the gaze vector and the component vector; and
adjusting a simulation setting of the virtual component based on the alignment value.

19. The computer-readable storage device of claim 18, wherein the operations further comprise:
determining available resources of the processor;
determining whether the available resources of the processor are greater than a simulation threshold; and
based on determining that the available resources of the processor are greater than the simulation threshold, adjusting the simulation setting of the virtual component to a base value.

20. The computer-readable storage device of claim 18, wherein the operations further comprise:
determining available resources of the processor; and
determining whether the available resources of the processor are less than or equal to a simulation threshold, wherein, based on determining that the available resources of the processor are less than or equal to the simulation threshold, the simulation setting of the virtual component is selectively adjusted based on the alignment value.

* * * * *

UNITED STATES PATENT AND TRADEMARK OFFICE
CERTIFICATE OF CORRECTION

PATENT NO. : 10,616,565 B2
APPLICATION NO. : 16/107946
DATED : April 7, 2020
INVENTOR(S) : William Wai Ho Cheung Page 1 of 1

It is certified that error appears in the above-identified patent and that said Letters Patent is hereby corrected as shown below:

In the Claims

Claim 6, Column 17, Line 1, after the word second, delete "area".
Claim 6, Column 17, Line 1, after the word virtual, insert --area--.

Signed and Sealed this
Sixteenth Day of June, 2020

Andrei Iancu
*Director of the United States Patent and Trademark Office*